United States Patent
Wu et al.

(10) Patent No.: US 8,301,965 B2
(45) Date of Patent: Oct. 30, 2012

(54) METHOD AND APPARATUS FOR CASCADE ENCODING

(75) Inventors: Gengshi Wu, Shenzhen (CN); Shaoquan Wu, Shenzhen (CN); Feng Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1078 days.

(21) Appl. No.: 12/212,180

(22) Filed: Sep. 17, 2008

(65) Prior Publication Data
US 2009/0013236 A1    Jan. 8, 2009

Related U.S. Application Data

(63) Continuation of application No. PCT/CN2006/003104, filed on Nov. 17, 2006.

(30) Foreign Application Priority Data

Apr. 18, 2006 (CN) .......................... 2006 1 0060360

(51) Int. Cl.
*H03M 13/00* (2006.01)
(52) U.S. Cl. ........ 714/755; 714/786; 714/784; 714/762; 714/788
(58) Field of Classification Search .................. 714/758, 714/763, 784, 755, 786, 702, 762, 788
See application file for complete search history.

(56) References Cited

U.S. PATENT DOCUMENTS

| 6,473,010 | B1 | 10/2002 | Vityaev et al. |
| 6,621,872 | B1 | 9/2003 | Jones et al. |
| 2007/0195905 | A1* | 8/2007 | Schatz .......................... 375/265 |

FOREIGN PATENT DOCUMENTS

CN    1428949    7/2003

OTHER PUBLICATIONS

First Chinese Office Action regarding Application No. 200610060360.6, mailed Nov. 14, 2008. Partial translation provided by Huawei Technologies Co., Ltd.
Second Chinese Office Action regarding Application No. 200610060360.6, mailed Apr. 10, 2009. Translation provided by Huawei Technologies Co., Ltd.
International Search Report for International Application No. PCT/CN2006/003104, dated Feb. 10, 2007, with English translation.

* cited by examiner

*Primary Examiner* — Guy Lamarre
(74) *Attorney, Agent, or Firm* — Harness, Dickey & Pierce, P.L.C.

(57) ABSTRACT

A cascade encoding method and apparatus are applied to a handheld television system or other fields. The method includes the following: A. Reed-Solomon (RS) encoding is performed on inputted Medium Access Control (MAC) packets, and coded MAC packets are outputted; and B. Low density parity check code (LDPC) encoding is performed on the coded MAC packets, and LDPC encoding blocks are outputted. The apparatus includes an RS coder and an LDPC coder. The RS encoding and LDPC encoding are cascaded to encode an inputted code flow, so as to reduce an error rate. Meanwhile, bytes in one RS encoding data block are dispersed into different LDPC blocks to be encoded through byte interleaving, thereby sufficiently utilizing error code characteristics of the RS encoding and the LDPC encoding for decoding, and improving error correction capability of a system.

18 Claims, 4 Drawing Sheets

METHOD AND APPARATUS FOR CASCADE ENCODING

CROSS-REFERENCE TO RELATED APPLICATIONS

This application is a continuation of International Application No. PCT/CN2006/003104, filed Nov. 17, 2006. This application claims the benefit and priority of Chinese Application No. 200610060360.6, filed Apr. 18, 2006. The entire disclosures of each of the above applications are incorporated herein by reference.

FIELD

The present disclosure relates to a handheld television field, and more particularly, to a cascade encoding method and apparatus.

BACKGROUND

This section provides background information related to the present disclosure which is not necessarily prior art.

Handheld television receives TV programs through a mobile terminal, i.e., receiving the streaming media and other data services through mobile network, so as to greatly enrich people's daily life and information communication. Mobile terminals include various handheld terminals, such as vehicle devices and notebook computers.

Currently, three major types of network systems for realizing handheld television services are provided as follows:

(1) Based on conventional mobile communication networks, such as unicast systems including Code Division Multiple Access (CDMA), Enhanced Data Rates for GSM Evolution (EDGE), and General Packet Radio Service (GPRS);

(2) Based on unicast and broadcasting systems in a satellite system, such as Satellite-Digital Multimedia broadcasting (S-DMB);

(3) Based on mobile broadcasting systems, such as Digital Video Broadcasting-Handheld (DVB-H) and Integrated Services Digital Broadcasting-Terrestrial (ISDB-T).

A handheld television system based on a conventional mobile communication network has advantages of being compatible with current systems, not requiring a user to change devices, and being capable of offering service rapidly. However, because handheld television services occupy an extremely wide bandwidth, while current 2G-3G systems only can provide quite limited frequency spectrum resources, the current mobile systems cannot support too much concurrent handheld television services, which may cause network blocking or breakdown.

A handheld television system based on a satellite unicast and broadcasting system has advantages of being capable of covering all areas through several satellites and having a relatively low total cost for large-scale broadcasting. However, such a system has a relatively long network building period, and an relatively low indoor distribution rate.

A handheld television system based on a mobile broadcasting network system may enable different users to watch the same program on the same channel. Compared with a point-to-point solution, such a system greatly saves data transmission amount, and make it possible to widely spread handheld television services.

In the aforementioned handheld television systems, in consideration of complexity and variability of a wireless channel, generally, channel equalizing and encoding technologies are adopted to reduce an error rate of a link. As shown in FIG. 1, a current system usually adopts cascading of Reed-Solomon (RS) encoding and Turbo encoding to encode an inputted high-priority code flow and low-priority code flow. However, the RS and Turbo cascade encoding has a relatively high error rate in a poor channel, and may not satisfy application requirements.

SUMMARY

This section provides a general summary of the disclosure, and is not a comprehensive disclosure of its full scope or all of its features.

Accordingly, the present disclosure is directed to a cascade encoding method and apparatus, so as to solve the technical problem in the prior art that the RS and Turbo cascade encoding has a relatively high error rate in a poor channel and cannot satisfy application requirements.

In order to solve the abovementioned technical problem, an embodiment provides a cascade encoding method, which includes:

A. Reed-Solomon (RS) encoding is performed on inputted Medium Access Control (MAC) packets, and coded MAC packets are outputted;

B. Low density parity check code (LDPC) encoding is performed on the coded MAC packets, and LDPC encoding blocks are outputted.

Furthermore, the present disclosure also provides a cascade encoding apparatus, which includes an RS coder and an LDPC coder.

The RS coder is adapted to perform RS encoding on inputted MAC packets and output coded MAC packets; and The LDPC coder is connected to the RS coder and adapted to perform LDPC encoding on the coded MAC packets and output LDPC encoding blocks.

It can be known from the technical solution that, in the various embodiments, RS encoding and LDPC encoding are cascaded to encode an inputted code flow, so as to reduce an error rate efficiently. At the same time, bytes in one RS encoding data block are dispersed into unassociated LDPC blocks to be encoded through byte interleaving to the utmost extent, so that error code characteristics of the RS encoding and the LDPC encoding are utilized sufficiently in RS decoding, and error correction capability of the system is improved efficiently.

Further areas of applicability will become apparent from the description provided herein. The description and specific examples in this summary are intended for purposes of illustration only and are not intended to limit the scope of the present disclosure.

DRAWINGS

The present disclosure will become more fully understood from the detailed description given herein below for illustration only, and thus are not limitative, and wherein.

Corresponding reference numerals indicate corresponding parts throughout the several views of the drawings.

DETAILED DESCRIPTION

Figure 1:
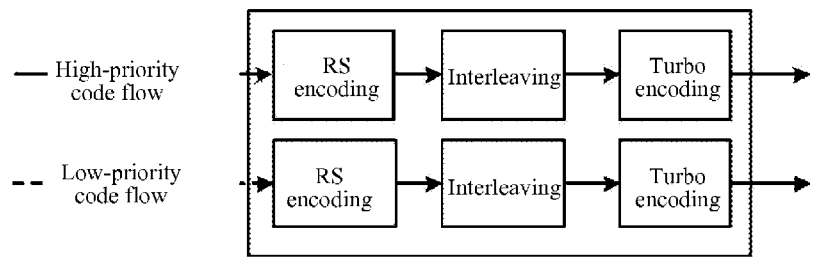
FIG. 1 is a schematic diagram of realizing a cascade encoding method in the prior art.

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

In order to make the technical problem to be solved, technical solution, and advantages of the present disclosure more comprehensible, embodiments accompanied with drawings are described in detail below, so as to further illustrate the present disclosure. It should be understood that the detailed embodiments are merely to explain, instead of limit, the present disclosure.

Low density parity check code (LDPC) is a linear block error correcting code defined by a low density check matrix (parity check) or a bipartite graph. When adopting a belief propagation (BP)-based iterative decoding algorithm, LDPC encoding has extraordinary error code characteristics. If the iteration converges, a whole decoding block contains no or few error bits; otherwise, the error correcting efficacy can be hardly generated, i.e., the decoding block contains quite a lot error bits. In many situations, the LDPC is superior to a Turbo code in performance, and has the following one or more of the following advantages: 1) having high flexibility and a low error floor; 2) having simple description, and verifiability regarding strict theoretical analysis; 3) having a lower decoding complexity than the Turbo code, and being capable of realizing completely parallel operations which is convenient for implementation of hardware; and 4) having a large throughput and the most potential of high-speed decoding. Therefore, in a handheld television system, the RS encoding and with the LDPC may be cascaded to reduce the error rate efficiently.

A cascade encoding method in the present disclosure includes: performing RS encoding on the inputted MAC packets and outputting coded MAC packets; and performing LDPC encoding on the coded MAC packets and outputting LDPC encoding blocks. The cascade encoding method may be applied in the handheld television system or other systems. The present disclosure is illustrated as being applied, for example, in the handheld television system.

According to the error code characteristics of the RS encoding and the LDPC encoding, the present disclosure cascades the RS encoding and LDPC encoding to encode an inputted code flow, performs the RS encoding on inputted Medium Access Control (MAC) packets firstly, then performs the LDPC encoding, and interleaves a data flow after the RS encoding in a unit of byte according to the complementary characteristics of the RS encoding and the LDPC encoding.

Figure 2:
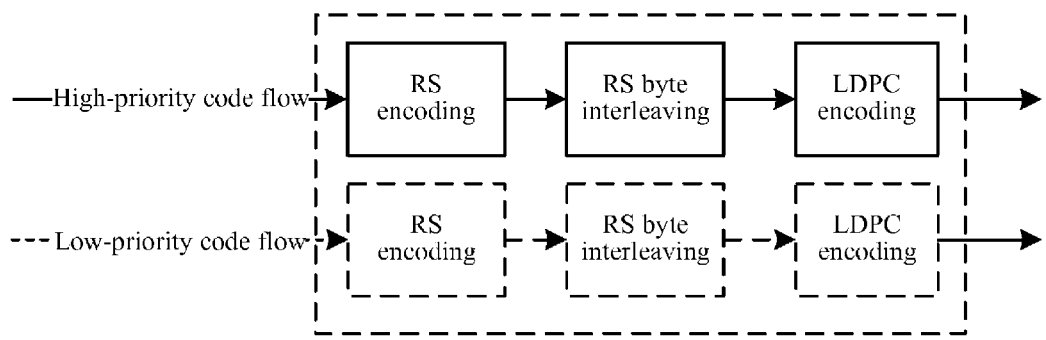
FIG. 2 is a schematic diagram of realizing a cascade encoding method according to an embodiment.

FIG. 2 shows a cascade encoding process according to the present disclosure, in which the RS encoding and LDPC encoding are cascaded to encode an inputted high-priority code flow and low-priority code flow, thereby outputting LDPC encoding blocks.

Figure 3:
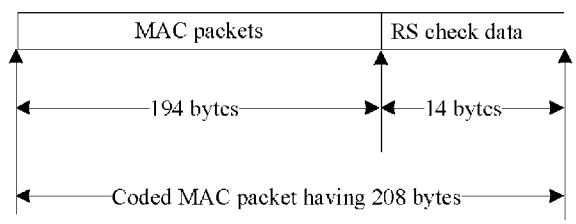
FIG. 3 is a schematic diagram of realizing RS encoding on MAC packets according to an embodiment.

The MAC packet delivered from an MAC layer has a size of 194 bytes. As shown in FIG. 3, in an embodiment, 8-bit RS encoding of (208, 194, 14) is performed once for one MAC packet, and a coded MAC packets of 208 bytes generated by the MAC packet of 194 bytes may correct an error of 7 bytes.

The specific principle for realizing RS encoding and LDPC encoding is well-known to persons skilled in the art, and will not be repeated herein.

In an embodiment, when the LDPC encoding is performed on the packets after the RS encoding, interleaving is firstly performed in a unit of byte (i.e., 8 bits) (however, it is not for limitation, encoding can also be performed in other units, such as Mbits), so that the bytes in one coded MAC packet are dispersed into different LDPC blocks to be encoded at the utmost extent. Due to the characteristics of the LDPC, the errors in the coded MAC packet may appear in a unit of byte during a decoding process, and the RS encoding may achieve a better error correcting effect.

Figure 4:
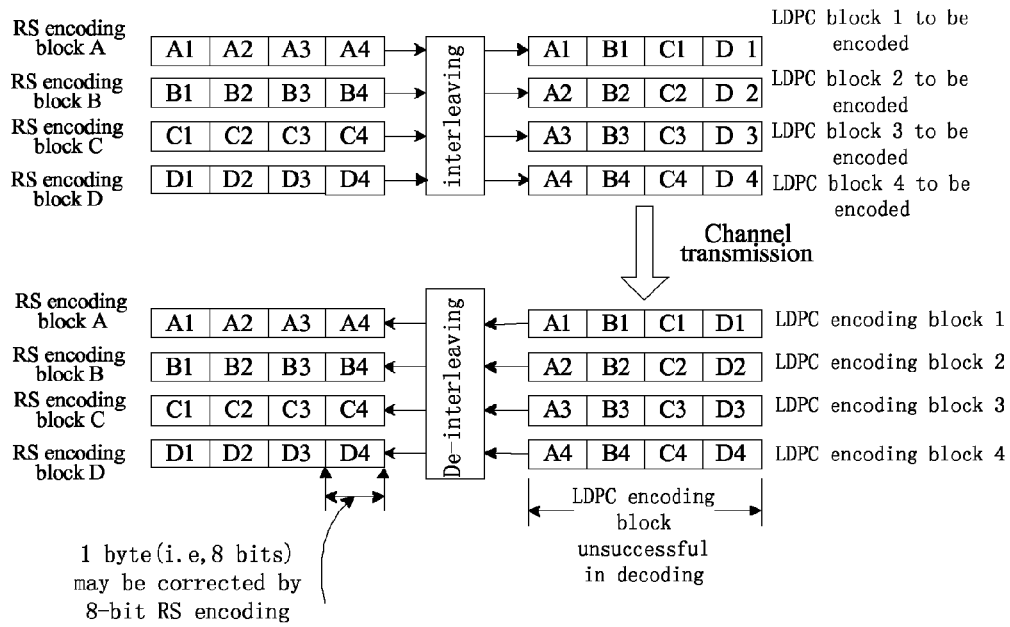
FIG. 4 is a schematic diagram of a principle of RS byte interleaving according to an embodiment.

As shown in FIG. 4, it is assumed that four RS encoding blocks and four LDPC blocks to be encoded are provided, and each data block contains four bytes of data. Nevertheless, the actual situation is much more complicated than that in FIG. 4. It can be seen from a sender in FIG. 4 that, the bytes D1, D2, D3, and D4 in the RS encoding block D are dispersed to the four LDPC blocks to be encoded after the byte interleaving. At a receiver in FIG. 4, after the LDPC decoding, the iterative decoding of the LDPC decoding block 4 is unsuccessful, and the four bytes A4, B4, C4, and D4 all contain errors. However, after de-interleaving operation, the four error bytes are dispersed to the four RS encoding blocks A, B, C, and D, and each error byte may be corrected through RS decoding operation, thereby achieving errorless communication.

In the current handheld television system, in order to better utilize time diversity, the minimum transmitting and receiving unit is a group frame, each group frame protection interval is composed of Orthogonal Frequency Division Multiplexing (OFDM) symbols of 3780 points, and each OFDM symbol includes 3744 data sub-carriers. In the present disclosure, the number of coded MAC packets carried in each group frame and the number of LDPC encoding blocks are both integers through design, as shown in Table 1:

TABLE 1

| Modulation Method | Number of coded MAC packets in a group frame of 1/2 rate | Number of coded MAC packets in a group frame of 2/3 rate | Number of coded MAC packets in a group frame of 3/4 rate | Number of LDPC encoding blocks of 3744 points in a group frame | Number of LDPC encoding blocks of 7488 points in a group frame |
|---|---|---|---|---|---|
| QPSK | 18 | 24 | 27 | 16 | 8 |
| 16QAM | 36 (18:18) | 48 (24:24) | 54 (27:27) | 32 | 16 |
| 32QAM | 45 (18:27) | 60 (20:30) | — | 40 | 20 |
| 64QAM | 54 (18:36) | 72 (24:48) | 81 (27:54) | 48 | 24 |

Moreover, in the current handheld television system, hierarchical modulation may be adopted in hierarchical transmission, the modulation modes are respectively 16 Quadrature Amplitude Modulation (QAM), 32QAM, and 64QAM, and the corresponding ratios of high-priority rates to low-priority rates are respectively 1:1, 2:3, and 1:2. (x:y). Table 1 shows the numbers of the high-priority coded MAC packets and the low-priority coded MAC packets, respectively. For example, (20:30) means that the number of the high-priority coded MAC packets is 20, and the number of the low-priority coded MAC packets is 30. In order to ensure the independence of the high-priority and low-priority code flows, interleaving need be performed on the corresponding data of the two code flows respectively, but the interleaving method is the same and will not be described separately below.

For sake of convenient description, the variables adopted are illustrated as below:

nTotalMACNum is the number of the coded MAC packets participating in the byte interleaving for once;

nTotalMACNum is the total number of bytes in the coded MAC packets participating in the byte interleaving for once;

nTotalMACNum is the number of the LDPC blocks to be encoded generated in one time of the byte interleaving.

nByteNumPerMAC is the number of bytes in each coded MAC packet, which is 208, but may be increased to other values;

nByteNumPerLDPC is the number of bytes in each LDPC block to be encoded, and the specific value of the variable depends on different encoding rates and the points of the LDPC encoding. For the LDPC encoding of 3744 points, the values of the variable at 1/2, 2/3, and 3/4 rates are respectively 234, 312, and 351; and for the LDPC encoding of 7488 points, the values of the variable at 1/2, 2/3, and 3/4 rates are respectively 468, 624, and 702. The two choices cover from a low-speed coding rate to a high-speed coding rate, which are optimal, but not for limitation, of this embodiment. nRand is a random factor introduced in a process of generating the LDPC blocks to be encoded, which may be a constant, or an index number nGrpFrmIndex of the current group frame containing the nTotalMACNum coded MAC packets.

In a nonhierarchical transmission mode, the values of the variables are the normal values in the table. In the hierarchical transmission mode, with regard to the high-priority and low-priority code flows, the variables are respectively corresponding to the values in the brackets in Table 1. For example, when the LDPC encoding of 3744 points and 1/2rate, and 16QAM are applied, the numbers of the high-priority and low-priority coded MAC packets are both 18, i.e., corresponding to (18: 18) in Table 1.

Figure 5:
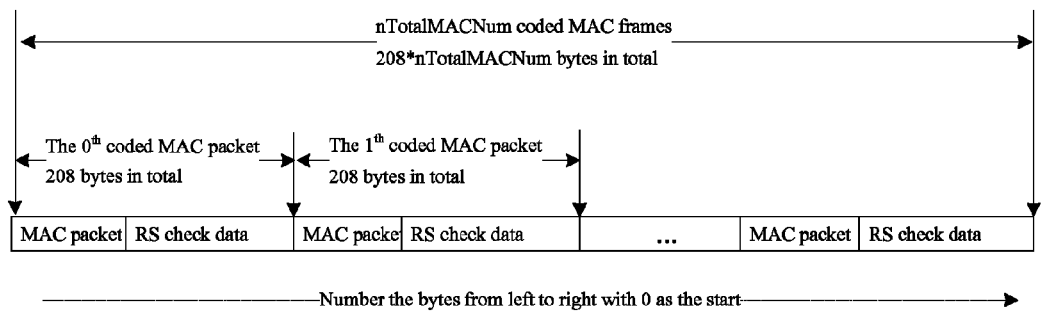
FIG. 5 is a process of realizing the RS byte interleaving according to a first embodiment.

FIG. 5 is a process of realizing the RS byte interleaving according to a first embodiment:

(1) The bytes in the nTotalMACNum coded MAC packets participating in the interleaving are renumbered, and the number of the $k^{th}$ numbered byte in the $n^{th}$ coded MAC packet is n*nByteNumPerMAC+k, in which n=0~(nTotalMAC-Num−1), and k=0~(nByteNumPerMAC−1);

(2) Bytes are selected from the numbered byte sequence to constitute the LDPC blocks to be encoded, and the $q^{th}$ byte in the $p^{th}$ LDPC block to be encoded is corresponding to the $r^{th}$ numbered byte in the numbered byte sequence:

$$r=\mod(n\text{TotalLDPCNum}*q+p+n\text{Rand},n\text{TotalByteNum});$$

in which p=0~(nTotalLDPCNum−1), q=0~(nByte-NumPerLDPC−1), and mod is modulus operation.

The number of bytes, 208, in one coded MAC packet is always greater than the number of bytes in the LDPC block to be encoded, and they have no multiple relationship. Therefore, LDPC block to be encoded may contain multiple bytes from the same coded MAC packet which are non-uniformly distributed. Regarding this, the random factor nRand for realizing randomization is introduced into the process of generating the LDPC blocks to be encoded. The nRand may be a constant, or the index number nGrpFrmIndex of the current group frame containing the nTotalMACNum coded MAC packets, which is adapted to prevent the abovementioned phenomenon from occurring in a fixed LDPC block to be encoded and coded MAC packet.

Hereinafter, an example is given to illustrate the interleaving process.

It can be known from Table 1 that, when the LDPC encoding of 3744 points and 1/2 rate, and QPSK modulation are applied, due to absence of the hierarchical modulation, the number of the coded MAC packets participating in the byte interleaving is nTotalMACNum=18, the number of the total bytes is nTotalByteNum=3744, the number of the corresponding LDPC blocks to be encoded is nTotalLDPC-Num=16, and the number of bytes in each LDPC block to be encoded is nByteNumPerLDPC=234. Without loss of generality, if nRand=0, the bytes corresponding to the $0^{th}$ LDPC block to be encoded are shown in FIG. 6.

Figure 6:
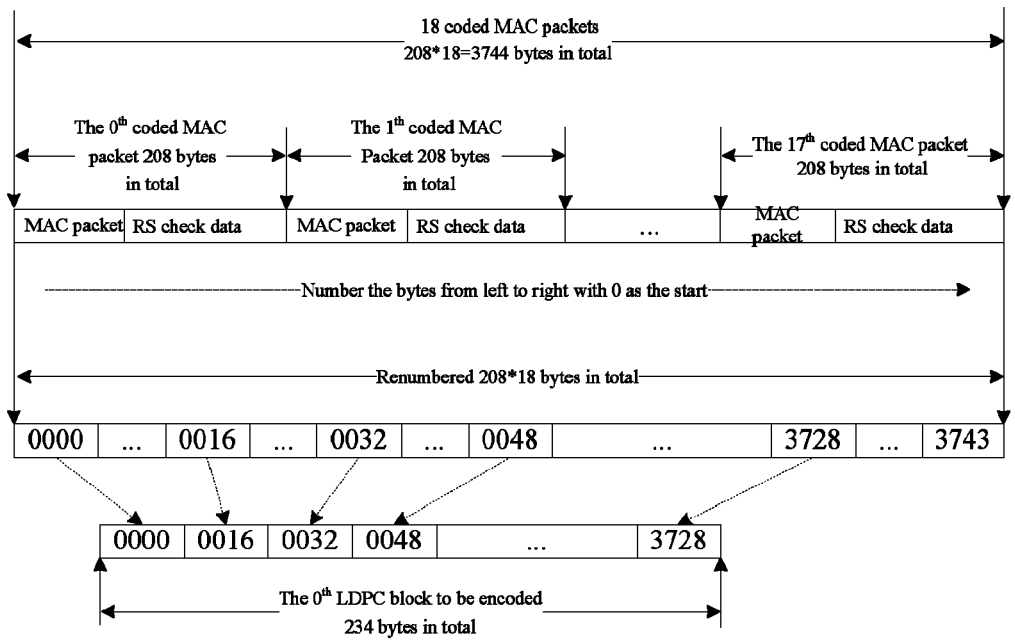
FIG. 6 is an exemplary diagram of realizing the RS byte interleaving according to the first embodiment.

It can be seen from FIG. 6 that, 234 bytes in the $0^{th}$ LDPC block to be encoded come from different coded MAC packets. Thus, at a decoder side, error bits in one LDPC decoding block are dispersed in different coded MAC packets in a unit of byte, so as to obtain a better effect when the RS decoding is performed on the coded MAC packets.

Figure 7:
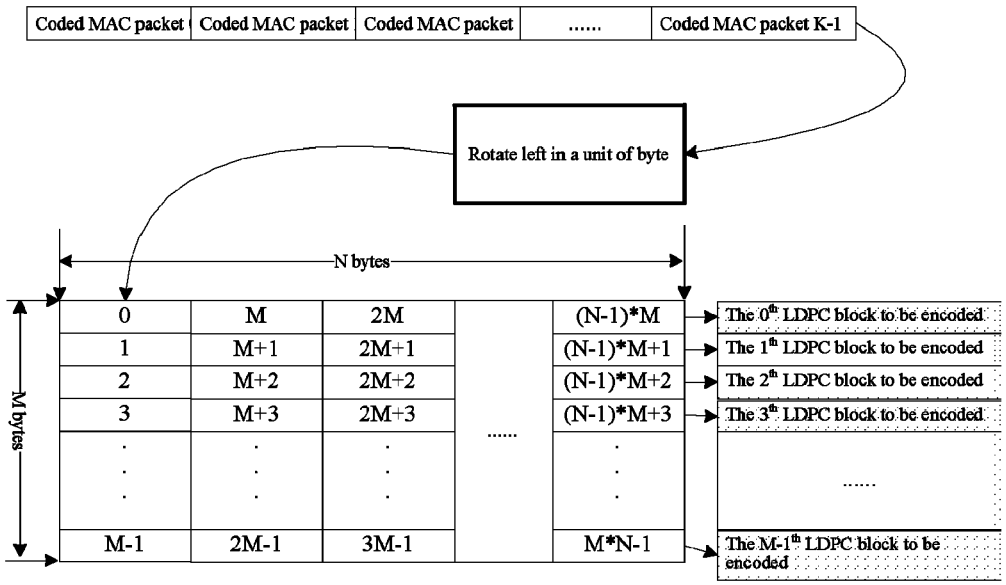
FIG. 7 is a process of realizing the RS byte interleaving according to a second embodiment.

FIG. 7 is a process of realizing the RS byte interleaving according to a second embodiment:

(1) The nTotalMACNum coded MAC packets are cascaded in sequence to form a combined data block having a length of nTotalMACNum*nByteNumPerMAC bytes;

(2) The combined data block is rotated left or right by nRand bits in a unit of byte, in which nRand is a random factor, and for example, may have a value of mod (nGrpFr-mIndex, nTotalLDPCNum), and mod is modulus operation;

(3) An interleaving matrix having nTotalLDPCNum rows and nByteNumPerLDPC columns is generated, and each matrix element is one byte. The rotated combined data block is sequentially filled into the interleaving matrix in a unit of byte in a column sequence. The bytes are filled from the $0^{th}$ row in the $0^{th}$ column along a row ascending direction, and filled to the $0^{th}$ row in the $1^{th}$ column after finishing the $0^{th}$ column. The rest may be deduced by analogy till all the nByteNumPerMAC*nTotalMACNum bytes have been filled;

(4) After the step (3), the nByteNumPerLDPC bytes in the $m^{th}$ row of the interleaving matrix with the filled bytes are extracted as the LDPC blocks to be encoded, in which m=0~ (nTotalLDPCNum−1).

Figure 8:
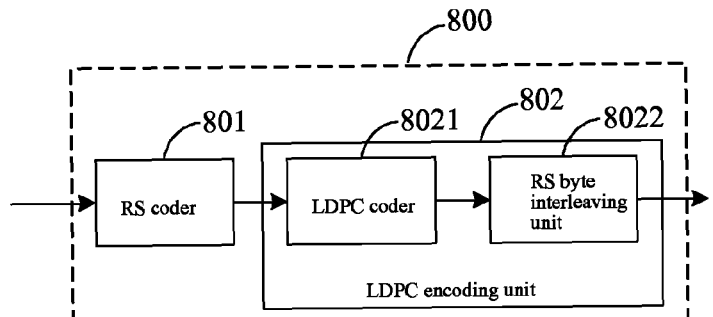
FIG. 8 is a structural diagram of a cascade encoding apparatus according to an embodiment.

Moreover, FIG. 8 is a schematic structural diagram of a cascade encoding apparatus 800 according to the present disclosure, which includes an RS coder 801 and an LDPC coder 802. The RS coder 801 performs the RS encoding on the MAC packets delivered from the MAC layer, and outputs the coded MAC packets. In an embodiment, the RS coder 801 performs 8-bit RS encoding on the MAC packets, and the encoding method is (208, 194, 14).

The LDPC coder 802 performs the LDPC encoding on the coded MAC packets outputted by the RS coder 801, and outputs LDPC encoding blocks. In an embodiment, the LDPC coder 802 includes an RS byte interleaving unit 8021 and an LDPC encoding unit 8022. The RS byte interleaving unit 8021 performs the byte interleaving on the coded MAC packets, and disperses the bytes in one coded MAC packet to different LDPC blocks to be encoded at the utmost extent.

The LDPC encoding unit 8022 performs the LDPC encoding on the LDPC block to be encoded outputted by the RS byte interleaving unit 8021, and outputs the LDPC encoding blocks.

Figure 9:
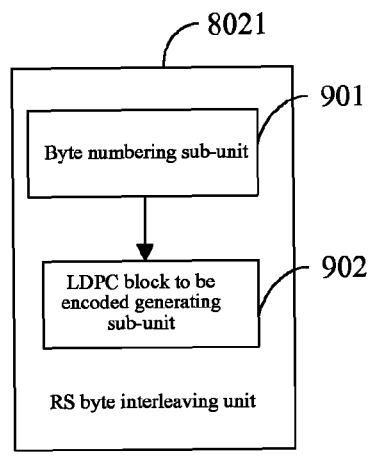
FIG. 9 is a structural diagram of an RS byte interleaving unit according to the first embodiment.

FIG. 9 is a schematic structural diagram of the RS byte interleaving unit 8021 according to the first embodiment, and the relevant variables have the same meaning as the above and will not be repeated herein.

A byte numbering sub-unit 901 renumbers the bytes in the nTotalMACNum coded MAC packets participating in the interleaving and generates a numbered byte sequence, in which the number of the $k^{th}$ numbered byte in the $n^{th}$ coded MAC packet is n*nByteNumPerMAC+k, n=0~(nTotalMACNum−1) and k=0~(nByteNumPerMAC−1).

An LDPC block to be encoded generating sub-unit 902, connected to the byte numbering sub-unit 901, is adapted to select bytes from the numbered byte sequence to constitute the LDPC blocks to be encoded, in which the $q^{th}$ byte in the $p^{th}$ LDPC block to be encoded is corresponding to the $r^{th}$ numbered byte in the numbered byte sequence, p=0~(nTotalLDPCNum−1), q=0~(nByteNumPerLDPC−1), and mod is modulus operation.

Figure 10:
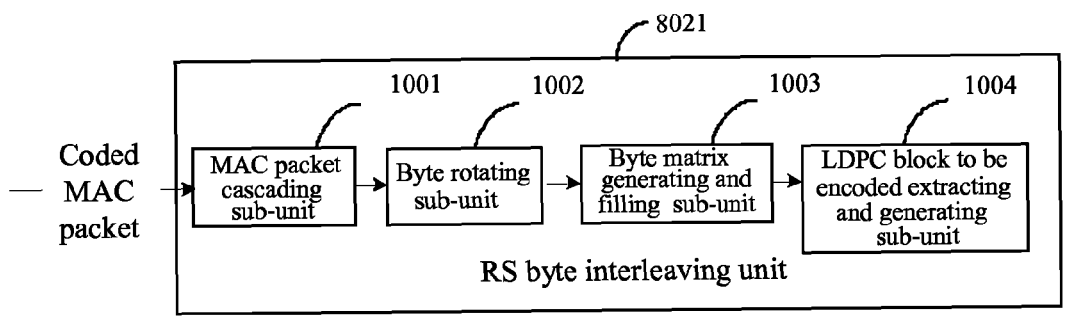
FIG. 10 is a structural diagram of an RS byte interleaving unit according to the second embodiment.

FIG. 10 is a schematic structural diagram of the RS byte interleaving unit 8021 according to the second embodiment, and the relevant variables have the same meaning as the above and will not be repeated herein.

An MAC packet cascading sub-unit 1001 cascades the nTotalMACNum coded MAC packets in sequence to form a combined data block having a length of nTotalMACNum*nByteNumPerMAC bytes.

A byte rotating sub-unit 1002, connected to the MAC packet cascading sub-unit 1001, is adapted to rotate the combined data block left or right by nRand bits in a unit of byte.

A byte matrix generating and filling sub-unit 1003, connected to the byte rotating sub-unit 1002, is adapted to generate an interleaving matrix with nTotalLDPCNum rows and nByteNumPerLDPC columns. Each matrix element is one byte, and the rotated combined data block is sequentially filled into the interleaving matrix in a unit of byte in a column sequence.

An LDPC block to be encoded extracting and generating sub-unit 1004, connected to the byte matrix generating and filling sub-unit 1003, is adapted to extract the nByteNumPerLDPC bytes in the $m^{th}$ row of the interleaving matrix with the filled bytes as the LDPC blocks to be encoded, in which m=0~(nTotalLDPCNum−1).

Moreover, in the present disclosure, the RS encoding may be performed in a unit of byte, and other encoding methods may also be adopted, such as encoding in Mbits. If the RS encoding is performed in a unit of byte, the error correction in the RS decoding is also performed in a unit of byte. For example, the embodiments illustrate the coder RS (208, 194, 14), which may correct an error of 7 bytes. Therefore, the byte interleaving unit following the RS coder also performs the interleaving in a unit of byte, so as to ensure that the interleaving only occur among bytes, and the byte sequence is unchanged. In addition, if the RS coder does not encode in a unit of byte, but in a unit of Mbits, the interleaving unit should also perform the interleaving with Mbits as a basic unit. At this time, the interleaving unit should be called Mbits interleaving unit. The Mbits interleaving unit can be implemented in the same way as the RS coder, and will not be repeated herein.

The preferred embodiments disclosed herein are not intended to limit the present disclosure. Any modifications, equivalent replacements, and improvements without departing from the spirit and principle of the present disclosure fall within the appended claims and their equivalents.

What is claimed is:

1. A cascade encoding method, comprising:
    A. performing Reed-Solomon (RS) encoding on inputted Medium Access Control (MAC) packets, and outputting coded MAC packets; and
    B. performing low density parity check code (LDPC) encoding on the coded MAC packets, and outputting LDPC encoding blocks;
    wherein the step B further comprises:
    B1. performing byte interleaving on the coded MAC packets and outputting LDPC blocks to be encoded;
    B2. performing the LDPC encoding on the LDPC blocks to be encoded, and outputting the LDPC encoding blocks.

2. The cascade encoding method according to claim 1, wherein the byte interleaving takes a byte as a basic unit.

3. The cascade encoding method according to claim 1, wherein B1 further comprises:
    S11. renumbering bytes in nTotalMACNum coded MAC packets participating in the interleaving, and generating a numbered byte sequence, wherein the number of the kth numbered byte in the nth coded MAC packet is n*nByteNumPerMAC+k;
    S12. selecting bytes from the numbered byte sequence to constitute the LDPC blocks to be encoded, the qth byte in the pth LDPC block to be encoded is corresponding to the rth numbered byte in the numbered byte sequence, wherein r=mod (nTotalLDPCNum*q+p+nRand, nTotalByteNum);
    wherein n=0~(nTotalMACNum−1), k=0~(nByteNumPerMAC−1), p=0~(nTotalLDPCNum−1), q=0~(nByteNumPerLDPC−1), mod is modulus operation, nTotalMACNum is the number of the coded MAC packets participating in the byte interleaving for once, nByteNumPerMAC is the number of bytes in each of the coded MAC packets; nTotalLDPCNum is the number of LDPC blocks to be encoded generated in one time of the byte interleaving; nTotalByteNum is the total number of bytes in the coded MAC packets participating in the byte interleaving for once; and nRand is a random factor introduced during a process of generating the LDPC blocks to be encoded.

4. The cascade encoding method according to claim 3, wherein the random factor nRand is a constant, or an index number of a group frame currently containing the nTotalMACNum coded MAC packets.

5. The cascade encoding method according to claim 4, wherein the group frame comprises 8 data frames.

6. The cascade encoding method according to claim 1, wherein B1 further comprises:
    S21. cascading the nTotalMACNum coded MAC packets in sequence to form a combined data block having a length of nTotalMACNum*nByteNumPerMAC bytes;
    S22. rotating the combined data block left or right by nRand bits in a unit of byte;
    S23. generating an interleaving matrix with nTotalLDPCNum rows and nByteNumPerLDPC columns, wherein each matrix element is one byte, and the rotated combined data block is sequentially filled into the interleaving matrix in a unit of byte in a column sequence; and
    S24. extracting nByteNumPerLDPC bytes in the mth row of the interleaving matrix with the filled bytes as the LDPC blocks to be encoded;
    wherein, m=0~(nTotalLDPCNum−1), mod is modulus operation, nTotalMACNum is the number of the coded MAC packets participating in the byte interleaving for once, nByteNumPerMAC is the number of bytes of each of the coded MAC packets, nTotalLDPCNum is the number of the LDPC blocks to be encoded generated in one time of the byte interleaving, nByteNumPerLDPC is the number of bytes in each of the LDPC blocks to be encoded, and nRand is a random factor.

7. The cascade encoding method according to claim 1, wherein the RS encoding is an 8-bit RS encoding.

8. The cascade encoding method according to claim 7, wherein the 8-bit RS encoding is (208, 194, 14).

9. The cascade encoding method according to claim 1, wherein the LDPC encoding is 3744 points or 7488 points, and a rate is 1/2, 2/3, or 3/4.

10. A cascade encoding apparatus, comprising:
an RS coder, adapted to perform RS encoding on inputted MAC packets and output coded MAC packets; and
an LDPC coder, adapted to perform LDPC encoding on the coded MAC packets and output LDPC encoding blocks;
wherein the LDPC coder further comprises:
an RS byte interleaving unit, adapted to perform byte interleaving on the coded MAC packets and output LDPC blocks to be encoded; and
an LDPC encoding unit, adapted to perform the LDPC encoding on the received LDPC blocks to be encoded and output the LDPC encoding blocks.

11. The cascade encoding apparatus according to claim 10, wherein the byte interleaving takes a byte as a basic unit.

12. The cascade encoding apparatus according to claim 10, wherein the RS byte interleaving unit further comprises:
a byte numbering sub-unit, adapted to renumber bytes in the nTotalMACNum coded MAC packets participating in the interleaving and generate a numbered byte sequence, wherein the number of the kth numbered byte in the nth coded MAC packet is n*nByteNumPerMAC+k; and
an LDPC block to be encoded generating sub-unit, adapted to select bytes from the numbered byte sequence to constitute the LDPC blocks to be encoded, wherein the qth byte in the pth LDPC block to be encoded is corresponding to the rth numbered byte in the numbered byte sequence, wherein r=mod(nTotalLDPCNum*q+p+nRand, nTotalByteNum);
wherein n=0~(nTotalMACNum−1), k=0~(nByteNumPerMAC−1), p=0~(nTotalLDPCNum−1), q=0~(nByteNumPerLDPC−1), mod is modulus operation, nTotalMACNum is the number of the coded MAC packets participating in the byte interleaving for once, nByteNumPerMAC is the number of bytes in each of the coded MAC packets; nTotalLDPCNum is the number of the LDPC blocks to be encoded generated in one time of byte interleaving; nTotalByteNum is the total number of bytes in the coded MAC packets participating in the byte interleaving for once; and nRand is a random factor introduced during a process of generating the LDPC blocks to be encoded.

13. The cascade encoding apparatus according to claim 12, wherein the random factor nRand is a constant, or an index number of a group frame currently containing the nTotalMACNum coded MAC packets.

14. The cascade encoding apparatus according to claim 13, wherein the group frame further comprises eight (8) data frames, and each of the data frames include eight (8) Orthogonal Frequency Division Multiplexing (OFDM) symbols.

15. The cascade encoding apparatus according to claim 10, wherein the RS byte interleaving unit further comprises:
an MAC packet cascading sub-unit, adapted to cascade the nTotalMACNum coded MAC packets in sequence to form a combined data block having a length of nTotalMACNum*nByteNumPerMAC bytes;
a byte rotating sub-unit, adapted to rotate the combined data block left or right by nRand bits in a unit of byte;
a byte matrix generating and filling sub-unit, adapted to generate an interleaving matrix with nTotalLDPCNum rows and nByteNumPerLDPC columns, wherein each matrix element is one byte, and the rotated combined data block is sequentially filled into the interleaving matrix in a unit of byte in a column sequence; and
an LDPC block to be encoded extracting and generating sub-unit, adapted to extract nByteNumPerLDPC bytes in the mth row of the interleaving matrix with the filled bytes as the LDPC blocks to be encoded;
wherein, m=0~(nTotalLDPCNum−1), mod is modulus operation, nTotalMACNum is the number of the coded MAC packets participating in the byte interleaving for once, nByteNumPerMAC is the number of bytes of each of the coded MAC packets, nTotalLDPCNum is the number of the LDPC blocks to be encoded generated in one time of the byte interleaving, nByteNumPerLDPC is the number of bytes in each of the LDPC blocks to be encoded, and nRand is a random factor.

16. The cascade encoding apparatus according to claim 11, wherein the RS encoding is an 8-bit RS encoding.

17. The cascade encoding apparatus according to claim 16, wherein the 8-bit RS encoding is (208, 194, 14).

18. The cascade encoding apparatus according to claim 10, wherein the LDPC encoding is 3744 points or 7488 points, and a rate is 1/2, 2/3, or 3/4.

* * * * *

UNITED STATES PATENT AND TRADEMARK OFFICE
CERTIFICATE OF CORRECTION

| | |
|---|---|
| PATENT NO. | : 8,301,965 B2 |
| APPLICATION NO. | : 12/212180 |
| DATED | : October 30, 2012 |
| INVENTOR(S) | : Gengshi Wu et al. |

It is certified that error appears in the above-identified patent and that said Letters Patent is hereby corrected as shown below:

Column 10, Line 42, Claim 16 "Claim 11" should be --Claim 10--.

Signed and Sealed this
Eighteenth Day of December, 2012

David J. Kappos
*Director of the United States Patent and Trademark Office*